3,262,351
SEPARATION NUT
James E. Webb, Administrator of the National Aeronautics and Space Administration, with respect to an invention of Anders R. Jensen
Filed Mar. 20, 1964, Ser. No. 353,645
3 Claims. (Cl. 85—33)

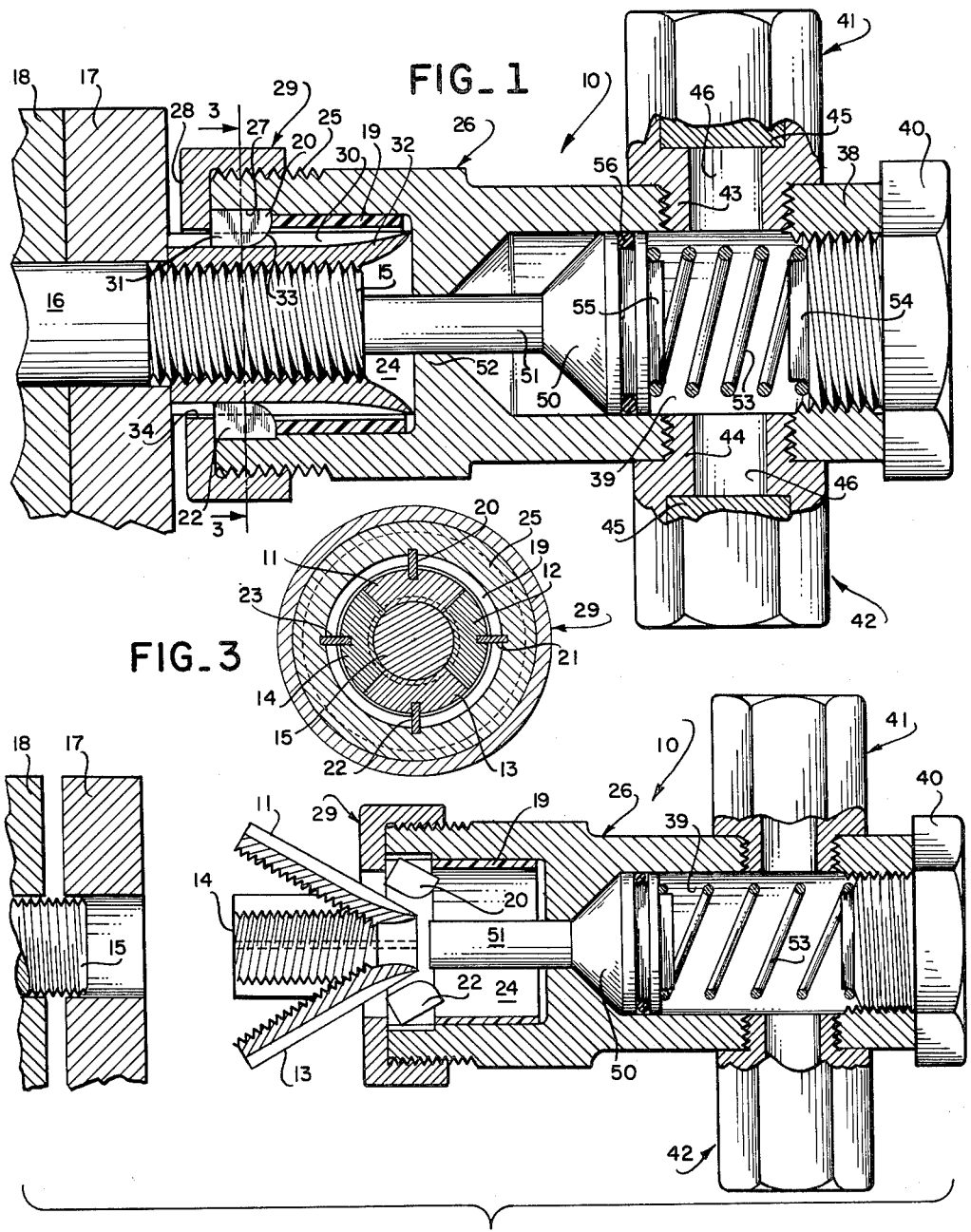
July 26, 1966    JAMES E. WEBB    3,262,351
ADMINISTRATOR OF THE NATIONAL AERONAUTICS
AND SPACE ADMINISTRATION
SEPARATION NUT
Filed March 20, 1964    2 Sheets-Sheet 1
INVENTOR.
ANDERS R. JENSEN
BY
Attorneys

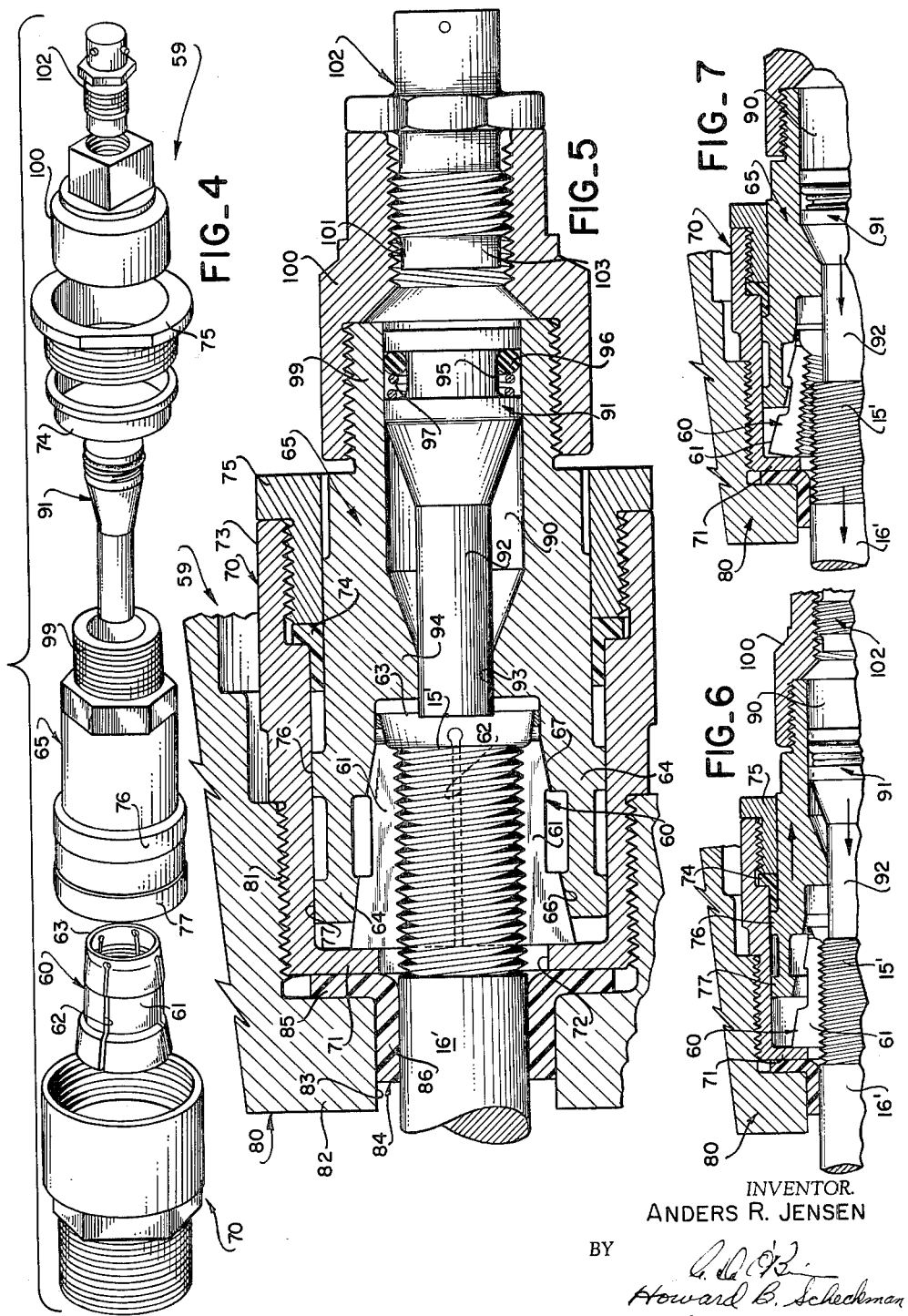

This invention relates to a contamination free separation nut and more particularly to a separation nut in which the combustion products of a squib are confined to a piston chamber so that the ambient surroundings are not contaminated with the combustion products.

Separation nuts have been utilized which depend upon remote actuation of a squib to provide a source of power to separate nut segments in order to remove the nut from a bolt. Upon ignition of the squib, the high pressure products of combustion act between the end of the bolt and the squib casing to produce relative movement therebetween causing separation of the nut. After separation, the products of combustion are released to atmosphere and represent a hazard to equipment and personnel in the vicinity. In the present invention, the products of combustion resulting from firing of the squib are applied to a piston which engages the end of the bolt and causes movement of the nut relatively to the bolt resulting in a separation of the nut from the bolt. The chamber behind the piston head is closed to confine the explosion so that the surrounding atmosphere is not contaminated. In one form of the invention, keys movable with the piston chamber exert the separation force on the nut by cocking the segments, and in another form of the invention, the nut segments are pulled off the bolt by a housing member attached to the piston casing.

It is therefore an object of the present invention to provide a contamination free separation nut in which the products of combustion generated by the firing of a squib are prevented from entering the atmosphere after separation of the nut.

Another object of the invention is to provide a contamination free separation nut in which the products of combustion act against a piston to produce the nut separation force and the products of combustion are retained in the piston chamber after separation.

Another object of the invention is to provide a contamination free separation nut in which a piston is forced against the end of the bolt and movement of the piston casing causes separation of the nut segments.

There are other objects of the invention not specifically set forth above which will become readily apparent from the accompanying description and drawings in which:

FIGURE 1 is a vertical section showing the separation nut of the present invention attached to the end of a bolt.

FIGURE 2 is a vertical section similar to FIGURE 1 showing the nut separated from the bolt.

FIGURE 3 is a transverse vertical section along line 3—3 of FIGURE 1 showing the segments forming the complete nut.

FIGURE 4 is an expanded perspective view of a modification of the invention.

FIGURE 5 is a sectional view of the separation nut of FIGURE 4 in assembled condition.

FIGURE 6 is a partial sectional view similar to FIGURE 5 with the parts in position to commence separation of the nut; and FIGURE 7 is a partial sectional view similar to FIGURE 5 showing separation of the nut from the bolt.

Referring to the form of the invention chosen for illustration in FIGURES 1-3, the separation nut 10 comprises four nut segments 11, 12, 13 and 14 which are threaded onto end 15 of a bolt 16. The bolt can serve to hold two plates 17 and 18 together with the nut engaging plate 17 and the bolt head (not shown) engaging plate 18. The segments are held in assembled condition by a retainer sleeve 19 and four keys 20, 21, 22 and 23 located within a cavity 24 formed in threaded cylindrical end 25 of casing 26. The sleeve 19 closely surrounds the nut segments and is held in position by the four keys. Each key is retained in an end slot 27 in the interior of casing end 25 by a flange 28 of end cap 29 which is threaded onto casing end 25. A cam slot 30 is formed in the outer surface of each nut segment and receives side 31 of one of the keys. The surface of each cam slot has an outwardly curved portion 32 and the side 31 of each key has a curved surface portion 33, said surface portions coacting in a manner presently to be described. Flange 28 of cap 29 has an opening 34 through which the nut segments extend into engagement with plate 17.

The casing 26 has a second cylindrical end 38 forming a chamber 39 which is closed by a threaded end plug 40. Two squibs 41 and 42 have threaded ends 43 and 44, respectively, which are inserted into opposed openings in end 38 adjacent plug 40. Each squib contains a powder charge 45 which can be remotely fired and the products of combustion enter chamber 39 through a passage 46 in each squib. A piston 50 is located within chamber 39 and has a piston rod 51 extending through a partition 52 separating chamber 39 from cavity 24. Compression spring 53 is located between end plug 40 and piston head 50 and continually urges the end of piston rod 51 against the bolt end 15 so that piston head 50 is located to one side of the openings 46. Projections 54 and 55 on plug 40 and piston head 50, respectively, serve to center spring 53, and sealing ring 56 in piston head 50 seals against the wall of piston chamber 39. It is therefore apparent that the portion of chamber 39 containing spring 53 and receiving the products of combustion from the squibs is continuously sealed from the atmosphere.

In operation, when it is desired to remove the nut segments from the bolt in order to release the plates, squibs 41 and 42 are fired to produce high pressure combustion gas which is directed into piston chamber 39 through passages 46. The high pressure gas causes the piston casing 26 to quickly move relative to the end of the bolt thereby moving the four keys along the cam slots 30 in the nut segments. As the keys approach the end of the cam slots, the ends of the segments opposite the keys are moved inwardly over the end of the bolt and the opposite ends of the segments are moved outwardly to release the bolt from the segments, as illustrated in FIGURE 2. At the same time, the piston head 50 reaches the end of chamber 39. During this operation, the products of combustion are retained in chamber 39 and are not released to the atmosphere. Thus, the piston chamber 26 can fall free of the bolt and contamination of the atmosphere is prevented.

A second form of the invention is illustrated in FIGURES 4–7 and comprises a separation nut 59 having an internally threaded, expandable nut 60 in the form of a sleeve which is divided into four nut segments 61 by four cuts 52 which terminate short of sleeve end 63. When sleeve 60 is threaded to end 15' of bolt 16', it is confined by end 64 of casing member 65. The end 64 has tapered surfaces 66 and 67 which engage similar surfaces on sleeve 61 to confine the sleeve in an assembled position. An outer housing member 70 has an end flange 71 containing an opening 72 through which the bolt 16' projects and the flange 71 engages the end of sleeve 61. The opposite end 73 of the member 70 is enlarged to receive a Teflon seal 74 and is internally threaded to receive seal retainer 75. The retainer 75 slidably engages the exterior surface of casing member 65 and angular projections 76 and 77 on casing member 65 slidably engage the interior of housing member 70 to permit relative movement between the housing 70 and casing 65. The structure 80 which is attached to the bolt 16' has an internally threaded portion 81 attached to the flange end of the housing 70. Also, structure 80 has an inward projection 82 defining an opening 83 which receives the bolt 16'. A bushing 84 of angular cross-section has one leg 85 located between flange 71 and projection 82 and another leg 86 located between projection 82 and bolt 16'.

Casing member 65 has an internal cavity 90 which contains a piston head 91 and a piston rod 92 which extends through an opening 93 in partition 94 which separates cavity 90 from sleeve 60. The piston head has a surface groove 95 containing sealing ring 96 which is compressed by a spring 97 against the wall of cavity 90. End 99 of casing member 65 is threaded to receive a nut 100 containing a threaded opening 101 in which is secured the squib 102.

Upon firing of the squib 102, products of combustion from the squib are discharged through end 103 into cavity 90 against the plunger head 91 causing the piston head initially to move against end 15' of the bolt. The pressure in cavity 90 overcomes the holding force of seal 74 and moves casing member 65 relative to the housing member 70 until the seal 74 engages the projection 76, as illustrated in FIGURE 6. In this position, the surfaces 66 and 67 of casing member 65 have moved away from the opposite surfaces on sleeve 60 so that they no longer confine the sleeve against the threaded end 15' of the bolt. Thereafter, the continuance of the pressure in cavity 90 causes movement of the housing 70 and structure 80 with the casing 65 so that the flange 71 lifts the nut segments 61 of the sleeve away from the threaded end of the bolt, as illustrated in FIGURE 7, in order to release the structure 80 from the bolt. At this time, the piston head 91 has reached the end of cavity 90 and the plunger 92 is fully extended. As in the prior embodiment, the products of combustion are continually confined within the chamber 90 during and after the removal of separation nut 59 so that the products will not be released into the atmosphere resulting in contamination of the atmosphere. In the present invention, the confinement of the products of combustion is accomplished by incorporation of a movable piston in a closed chamber to produce the separation force. It is understood that the separation nut of the present invention can be applied to a variety of structures and that the flange 71 of the second embodiment can be tightened against a plate rather than carry a structure such as structure 80. Various other modifications are contemplated by those skilled in the art without departing from the spirit and scope of the invention as hereafter defined by the appended claims.

What is claimed is:

1. A contamination free separation nut for attachment to the threaded end portion of a bolt to secure structural members together, comprising:
   (a) a segmented nut comprising a plurality of nut segments in threaded engagement with said bolt end portion;
   (b) casing means for normally retaining said nut segments on said bolt and containing a closed chamber;
   (c) piston means comprising a piston head located in said closed chamber and a piston rod located opposite the end of said bolt;
   (d) a coil spring carried within said chamber and located between the closed end of the chamber and engaging the side of the piston head opposite the piston rod, said spring applying an axial force on said piston head so as to urge said piston rod into engagement with the end of said bolt, said spring permitting said piston rod to move inward in said closed chamber to permit tightening of said segmented nut on said bolt;
   (e) means for introducing a working fluid into said closed chamber to move said piston rod against the end of said bolt to cause movement of said casing means relative to said bolt to release said segments;
   (f) said chamber being constructed to limit outward travel of said piston head to maintain said chamber in closed condition and prevent the escape of said working fluid; and
   (g) means movable with said casing means for exerting a separation force on the segments of said nut.

2. A contamination free separation nut for attachment to the threaded end portion of a bolt to secure structural members together, comprising:
   (a) an expandable nut in the form of a sleeve which is divided into a plurality of nut segments in threaded engagement with said bolt end portion, said segments being defined by axially extending cuts which terminate short of the sleeve end;
   (b) casing means containing a tapered surface that coacts with a complimentary surface on said sleeve for normally retaining said nut segments on said bolt and containing a closed chamber;
   (c) piston means comprising a piston head located in said closed chamber and a piston rod located opposite the end of said bolt;
   (d) means for introducing a working fluid into said chamber to move said piston rod against the end of said bolt to cause movement of said casing means axially away from said segments whereby at least the free end of said sleeve may expand radially to release said segments;
   (e) said chamber constructed to limit outward travel of said piston head to maintain said chamber in closed condition and prevent escape of said working fluid;
   (f) housing means slideably mounted on said casing means, said housing means having a portion normally engaging the inner end of each nut segment; and
   (g) means for moving said housing means with said casing means after movement of said casing means from its nut retaining position, in order to separate said nut segments by force applied by said portion engaging the inner end of each nut segment.

3. A contamination free separation nut for attachment to the threaded end portion of a bolt to secure structural members together, comprising:
   (a) an expandable nut in the form of a sleeve which is divided into a plurality of nut segments in threaded engagement with said bolt end portion, said segments being defined by axially extending cuts which terminate short of the sleeve end;
   (b) casing means for normally retaining said nut segments on said bolt and containing a closed chamber;
   (c) piston means comprising a piston head located in said closed chamber and a piston rod located opposite the end of said bolt, for engaging the end of said bolt, and developing a nut separation force;
   (d) means for introducing high pressure combustion products into said closed chamber to move said piston rod against the end of said bolt to cause relative movement between said casing means and said bolt;
   (e) said casing means normally surrounding said segments and having an open end for receiving said segments, said casing means containing a tapered surface that coacts with a complementary surface on said sleeve to hold said nut segments in engagement with said bolt and axially away from said segments whereby at least the free end of said sleeve may expand radially;
   (f) housing means slideably mounted on said casing means and having a portion normally engaging the inner end of each nut segment, means for moving said housing means with said casing means after movement of said open end from its nut segment retaining position in order to separate said nut segments by force applied by said portion engaging the inner end of each nut segment when high pressure combustion products are introduced into said chamber; and (g) said chamber being constructed to limit outward travel of said piston head to prevent escape of said combustion products.

References Cited by the Examiner

UNITED STATES PATENTS

| | | | |
|---|---|---|---|
| 3,053,131 | 9/1962 | Stott | 85—33 |
| 3,084,597 | 4/1963 | Beyer | 89—1.01 |
| 3,119,302 | 1/1964 | Barr | 85—1 |
| 3,147,663 | 9/1964 | Brown | 85—33 |
| 3,157,215 | 11/1964 | Zahodiakin | 85—33 |
| 3,169,443 | 2/1965 | Stott | 85—1 |
| 3,170,363 | 2/1965 | Dickie | 85—33 |

FOREIGN PATENTS 834,143    8/1938    France.

CARL W. TOMLIN, *Primary Examiner.*

EDWARD C. ALLEN, *Examiner.*

M. PARSONS, Jr., *Assistant Examiner.*